(12) United States Patent
Chandrasekaran et al.

(10) Patent No.: US 10,567,239 B2
(45) Date of Patent: Feb. 18, 2020

(54) TECHNIQUES OF PROVIDING DATA TO SCREEN SAVER OF THIN CLIENT

(71) Applicant: AMZETTA TECHNOLOGIES, LLC, Norcross, GA (US)

(72) Inventors: Balasubramanian Chandrasekaran, Chennai (IN); Manikandan Ganesan Malliga, Dindigul (IN); Yugender P. Subramanian, Redmond, WA (US); Varadachari Sudan Ayanam, Suwanee, GA (US)

(73) Assignee: AMZETTA TECHNOLOGIES, LLC, Norcross, GA (US)

( * ) Notice: Subject to any disclaimer, the term of this patent is extended or adjusted under 35 U.S.C. 154(b) by 0 days.

(21) Appl. No.: 15/798,676

(22) Filed: Oct. 31, 2017

(65) Prior Publication Data

US 2019/0132215 A1    May 2, 2019

(51) Int. Cl.
| | |
|---|---|
| *G06F 15/16* | (2006.01) |
| *H04L 12/24* | (2006.01) |
| *H04L 12/26* | (2006.01) |
| *H04L 29/06* | (2006.01) |
| *H04L 29/08* | (2006.01) |

(52) U.S. Cl.
CPC .......... *H04L 41/22* (2013.01); *H04L 43/0817* (2013.01); *H04L 67/08* (2013.01); *H04L 67/36* (2013.01); *H04L 67/42* (2013.01)

(58) Field of Classification Search
CPC ............................. H04L 41/22; H04L 43/0817
See application file for complete search history.

(56) References Cited

U.S. PATENT DOCUMENTS

| | | | | |
|---|---|---|---|---|
| 5,819,284 A | * | 10/1998 | Farber | G06F 16/335 709/203 |
| 6,507,351 B1 | * | 1/2003 | Bixler | G06F 3/0481 715/810 |
| 2002/0019844 A1 | * | 2/2002 | Kurowski | G06F 9/5072 709/201 |
| 2006/0116166 A1 | * | 6/2006 | Hibino | H04W 28/18 455/557 |
| 2010/0275047 A1 | * | 10/2010 | Kaneko | G06F 1/3203 713/323 |
| 2012/0036251 A1 | * | 2/2012 | Beaty | G06F 9/45558 709/224 |
| 2014/0089709 A1 | * | 3/2014 | Furuya | G06F 1/3234 713/323 |
| 2014/0109076 A1 | * | 4/2014 | Boone | G06F 8/65 717/170 |
| 2014/0281632 A1 | * | 9/2014 | Kitajima | G06F 1/3206 713/323 |
| 2016/0209059 A1 | * | 7/2016 | Castillo | G05B 15/02 |
| 2017/0336947 A1 | * | 11/2017 | Bliss | G06F 3/04842 |
| 2019/0179627 A1 | * | 6/2019 | Sugiyama | G06F 8/654 |

* cited by examiner

*Primary Examiner* — Douglas B Blair
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a thin client. The thin client determines that a condition for displaying a screen saver is met. The thin client then obtains a first collection of content data. The thin client further generates a screen saver presenting the first collection of content data. The thin client displays the screen saver.

17 Claims, 8 Drawing Sheets ly*.

TECHNIQUES OF PROVIDING DATA TO SCREEN SAVER OF THIN CLIENT

BACKGROUND

Field

The present disclosure relates generally to networked computer systems, and more particularly, to techniques of generating and displaying various data on a screen saver of a thin client.

Background

The statements in this section merely provide background information related to the present disclosure and may not constitute prior art.

Computers are becoming increasingly ubiquitous, and are becoming pervasively integrated into the environment. For many users, this introduces the issue of configuring, maintaining and managing operating systems, applications and data on a number of computers.

A thin client device or zero client device is a client computer that operates in a client-server architecture. Thin clients are arranged to perform as little processing as possible, and the majority of the processing is performed by a server to which the thin client device is connected. This is in contrast to regular desktop or laptop computers (which can be considered "thick" clients), as the majority of the processing is performed on a local processor.

As the user's data, applications and operating systems are installed centrally on the server in a thin client architecture, the issue of configuring, maintaining and managing the computers becomes more manageable for the user. A single server can be arranged to support a large number of thin client devices. Furthermore, the lower amount of processing power used by a thin client device enables it to be made smaller and more power efficient than an equivalent "thick" client.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a thin client. The thin client determines that a condition for displaying a screen saver is met. The thin client then obtains a first collection of content data. The thin client further generates a screen saver presenting the first collection of content data. The thin client displays the screen saver.

DETAILED DESCRIPTION

Figure 1:
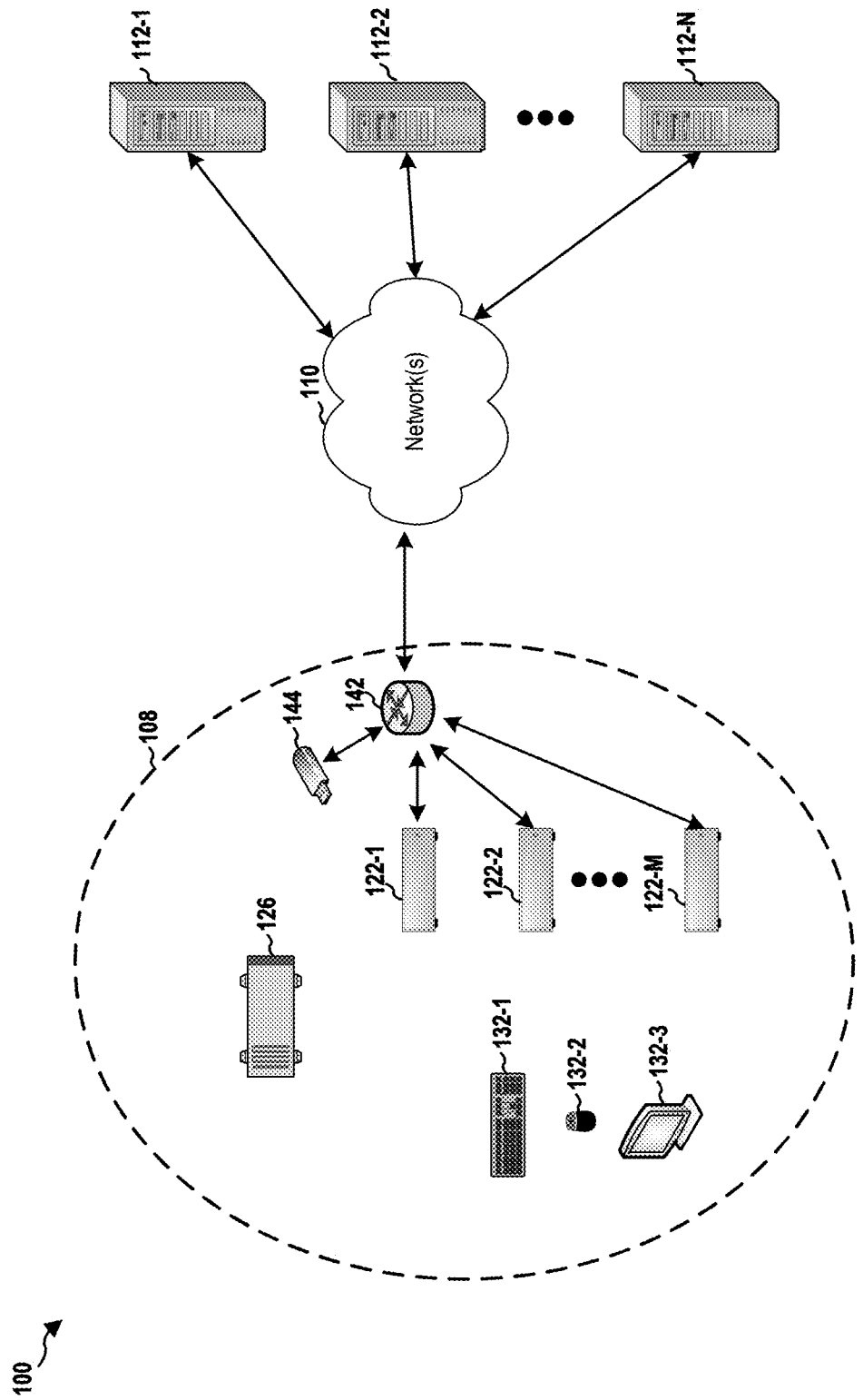
FIG. 1 is a diagram illustrating networked thin clients and remote machines.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram 100 illustrating networked thin clients and remote machines. One or more of M thin clients 122-1, 122-2, . . . , 122-M each may be utilized to establish a respective session with one or more of N remote machines 112-1, 112-2, . . . , 112-N, M and N each being a respective integer greater than 0. In certain configurations, the thin clients 122-1, 122-2, . . . , 122-M may be in communication with the remote machines 112-1, 112-2, . . . , 112-N through a network 110 (e.g., Internet). Each of the remote machines 112-1, 112-2, . . . , 112-N may be a virtual machine or a physical machine. Each of the thin clients 122-1, 122-2, . . . , 122-M may be wirelessly connected with one or more peripherals, e.g., peripherals 132-1, 132-2, 132-3.

Further, a remote machine manager 126 may be utilized to manage the thin clients 122-1, 122-2, . . . , 122-M, the remote machines 112-1, 112-2, . . . , 112-N, and/or the peripherals 132-1, 132-2, 132-3. The networked peripherals, the remote machine manager 126, and the thin clients 122-1, 122-2, . . . , 122-M may be in the same LAN 108, e.g., a wireless local area network (WLAN) or a wired LAN. In certain configurations, those devices may be in a different type of network.

Figure 2:
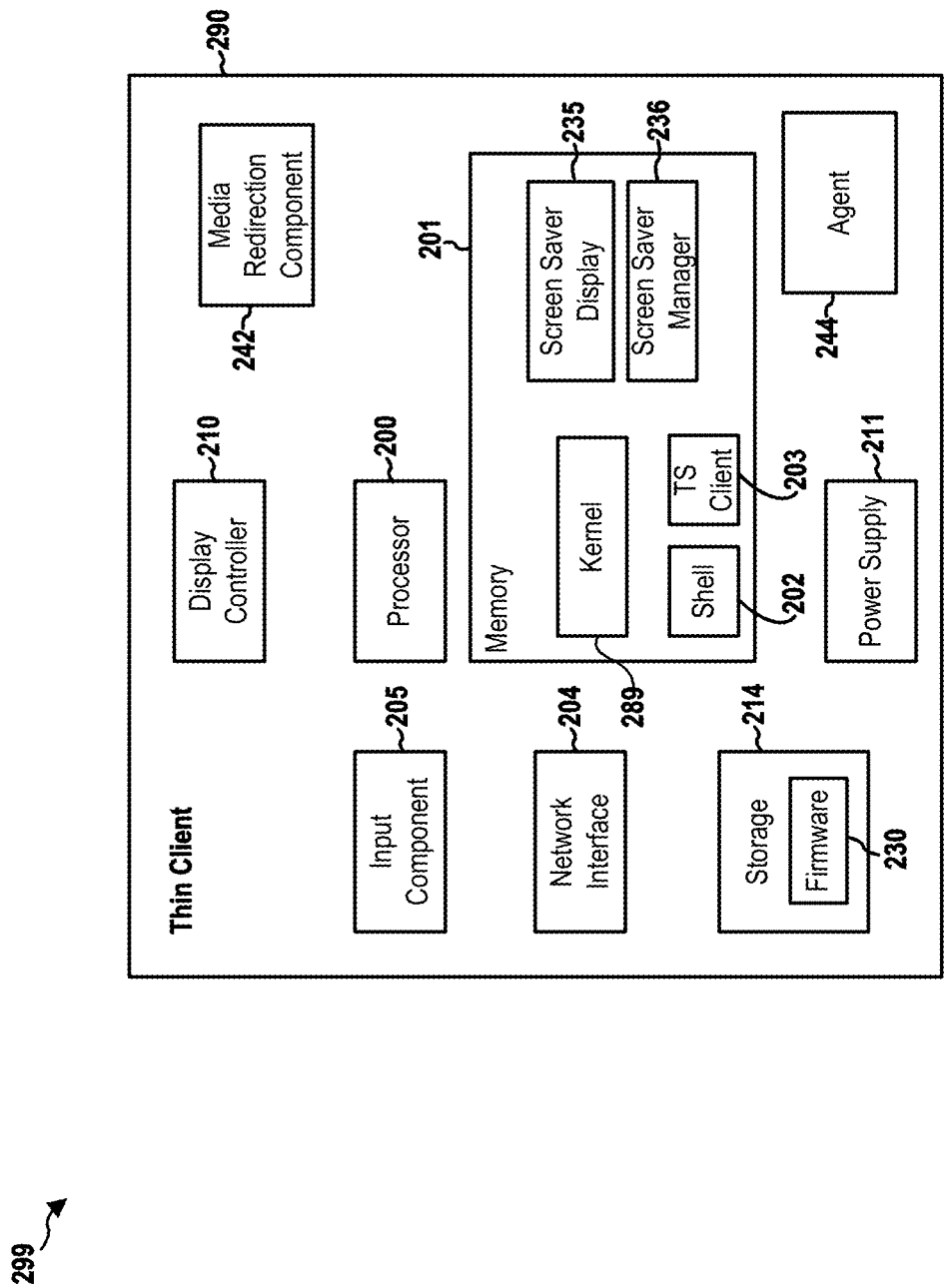
FIG. 2 is a diagram illustrating an exemplary thin client.

FIG. 2 is a diagram 299 illustrating an exemplary thin client. A thin client 290, which may be any one of the thin clients 122-1, 122-2, . . . , 122-M, includes one or more processors 200, which can be microprocessors, controllers or any other suitable type of processors for processing computing executable instructions to control the operation of the device. The computer executable instructions can be provided using any computer-readable media, such as memory 201. The memory 201 is of any suitable type such as random access memory (RAM). The thin client 290 may also include a storage component 214, which may be a storage device of any type such as a magnetic or optical storage device, a hard disk drive, a CD, DVD, or other disc drive, a flash memory, an EPROM, or an EEPROM.

The thin client 290 may store firmware 230 in the storage component 214. When the processor 200 executes the firmware 230, the processor 200 loads code and data of the firmware 230 into the memory 201. This example shows that the firmware 230 provides in the memory 201, among other components, a kernel 289, a software shell 202, a terminal server (TS) client 203 application, a screen saver display component 235, and a screen saver management component 236, which are described in more detail infra.

A network interface 204 enables the thin client 290 to communicate over a network (in particular a wireless network) with the remote machines 112-1, 112-2, . . . , 112-N. The network interface 204 can be, for example, a WLAN interface, a cellular radio interface, a personal area network (PAN) interface, or any other suitable interface for transmitting and receiving network data. Note that in other examples, a wireless network interface can be replaced with a wired communication interface.

The thin client 290 also includes an input component 205. The input component 205 can be wirelessly connected with input peripherals (e.g., the keyboard 132-1 and the mouse 132-2) and receive input from the input peripherals.

Image output of the thin client 290 can be provided by a display controller 210. The display controller 210 may send image signals to a display peripheral. In particular, the display controller 210 may send image packets to a WLAN display via the network interface 204. The thin client 290 further comprises a power supply 211 such as a battery or a wired power source.

The thin client 290 may also include a media redirect component 242 that redirects a media device to a remote machine. Further, the thin client 290 may also include an agent 244 that can be used to communicate with the remote machine manager 126.

Figure 3:
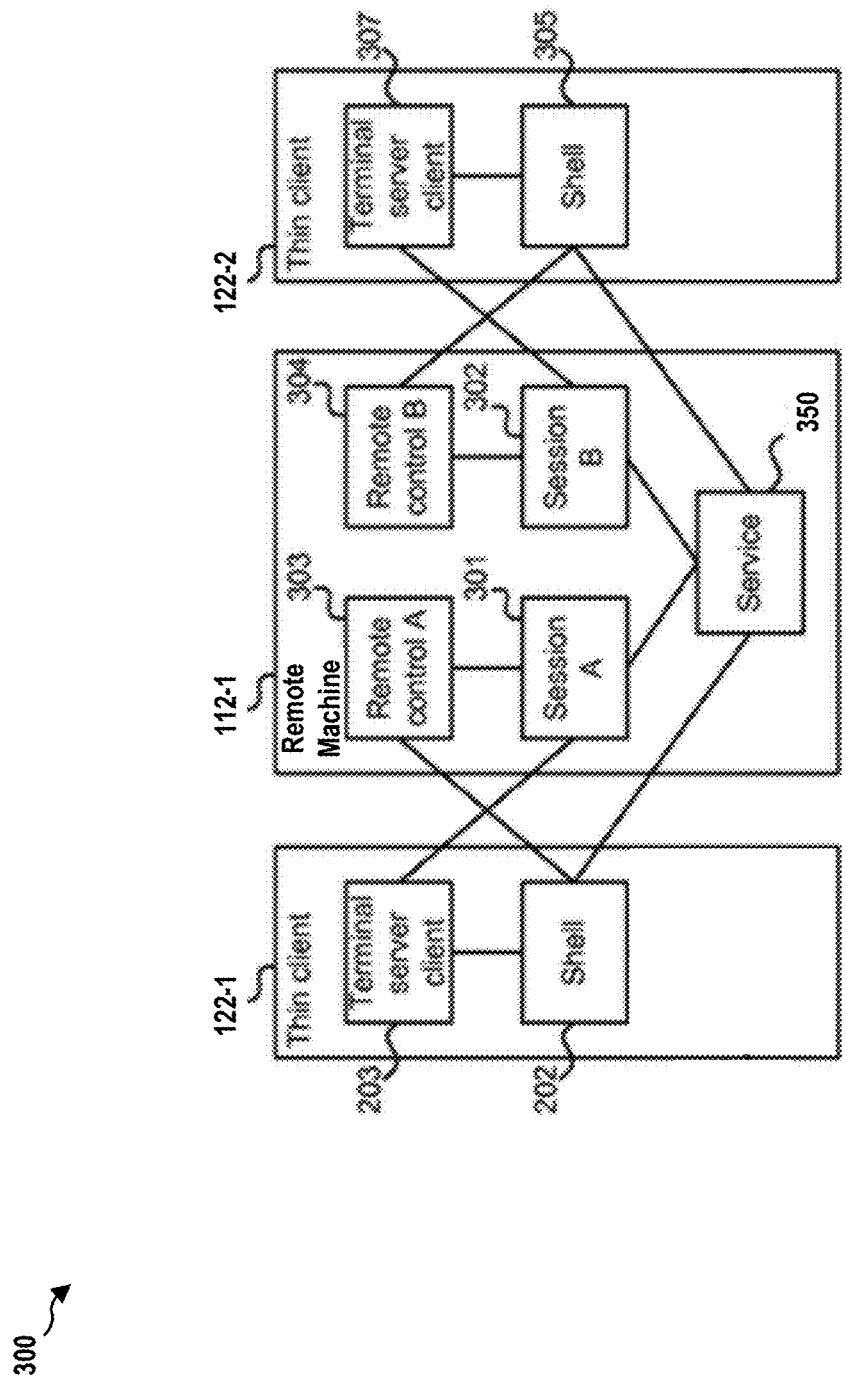
FIG. 3 is a diagram illustrating an example functional block diagram of elements in a thin client system.

FIG. 3 is a diagram 300 illustrating an example functional block diagram of the elements in a thin client system including the thin client 122-1 and the thin client 122-2 and the remote machine 112-1. The thin client 122-1 may include a shell 202 and a terminal server client 203, as described supra. The shell 202 is a lightweight control program that controls the basic operation of the thin client 122-1. In particular, the shell may determine what sessions are available on the remote machine 112-1, and may provide an interface on the display of the thin client 122-1 for the user to select a session to log into. The terminal server client 203 is a program that enables the user to interact with a particular session, and view the user interface of the session on the display of the thin client 122-1.

The remote machine 112-1 may include a software service 350 which is arranged to control and manage multiple sessions executed on the remote machine 112-1. In the example shown in FIG. 3, two sessions are running on the remote machine 112-1: session A 301 and session B 302. In other examples, more sessions could also be running on the remote machine 112-1 as well. Also note that the service 350 and sessions 301, 302 do not have to be running on the same remote machine 112-1 as shown in FIG. 3, but can be running on different remote machines. For example, instead of on the remote machine 112-1, the session 302 may be running on the remote machine 112-2.

Each session corresponds to applications and data that are accessible to one or more users. In certain configurations, a session may include a user interface of a remote desktop (i.e., a complete view of a computer desktop with several accessible applications). In certain configurations, a session may only include one or more individual applications. For example, session A 301 may correspond to a first user using a word processing application in a desktop, and session B 302 may be a stand-alone calendar application that is accessible to several users. In one example, the session is provided to the TS client 203 using a remote session protocol such as the remote desktop protocol (RDP) or virtual network computing (VNC), which may enable both desktop and application remote operation.

Each session 301, 302 on the remote machine 112-1 is optionally executing a software remote control 303, 304. The remote control 303, 304 enables the user in a session to change settings of the thin client device (even though the remote control is on the remote machine, and not on the thin client device itself). For example, these settings may include display settings at the thin client 122-1.

In the example of FIG. 3, the thin client 122-1 is accessing session A 301. The shell 202 receives data from the sensing device 206, and communicates with the TS client 203 and the service 301 on the remote machine 112-1. Session A 301 communicates with the TS client 203 and remote control A 303. Remote control A 301 communicates with the shell 202 on the thin client 122-1.

The remote machine 112-1 in FIG. 3 is also shown connected to the thin client 122-2. The thin client 122-2 has a similar structure to the thin client 122-1 in that it includes a shell 305 and a TS client 307. The thin client 122-2 is shown accessing session B 302 in FIG. 3.

Figure 4:
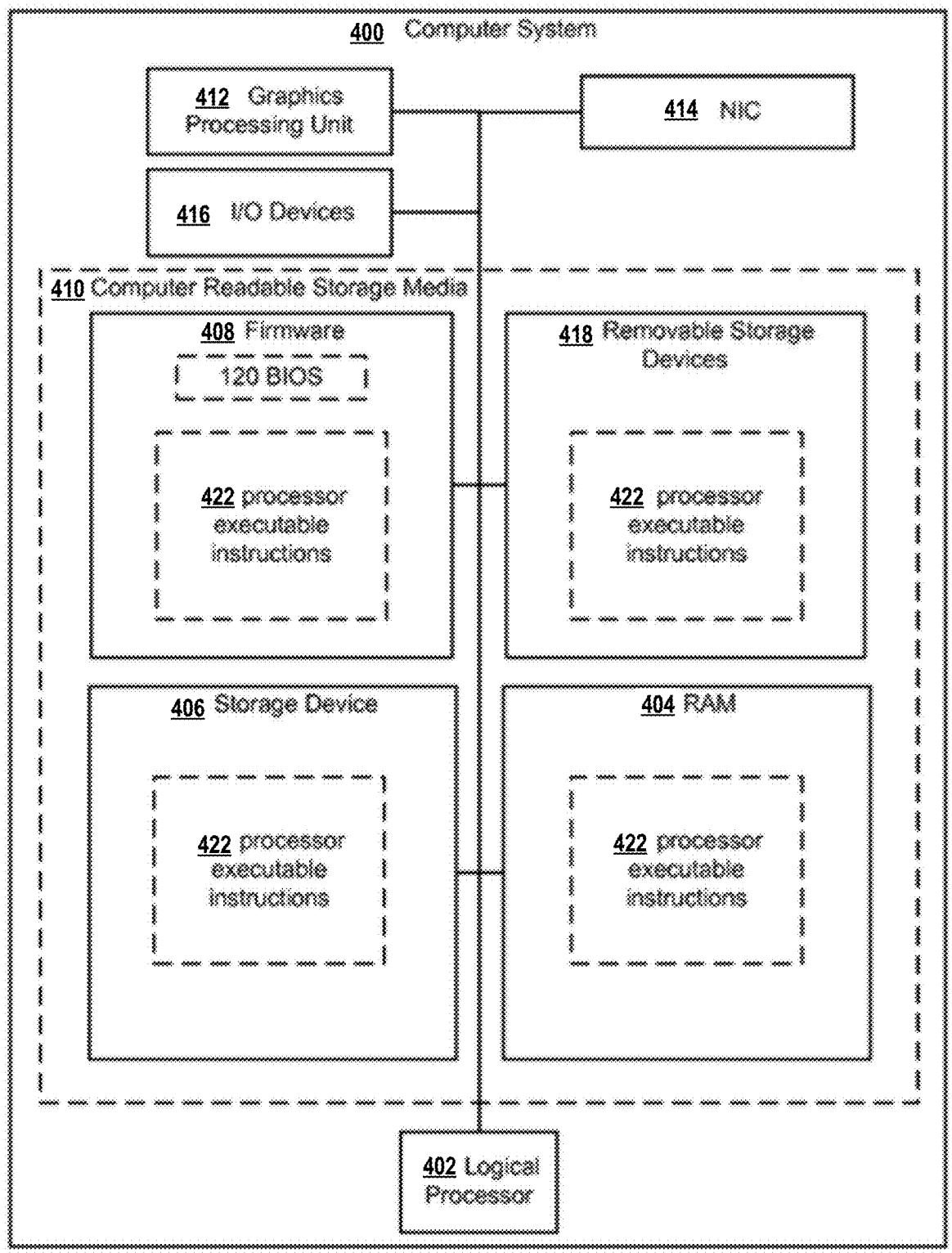
FIG. 4 is a diagram illustrating an exemplary computing system.

As described supra, each of the remote machines 112-1, 112-2, . . . , 112-N may be a virtual machine or a physical machine. Referring now to FIG. 4, an exemplary computing system 400 (i.e., a physical machine) is depicted. Computer system 400 can include logical processor 402, e.g., an execution core. While one logical processor 402 is illustrated, in other embodiments computer system 400 may have multiple logical processors, e.g., multiple execution cores per processor substrate and/or multiple processor substrates that could each have multiple execution cores. As shown by the FIG. 4, various computer readable storage media 410 can be interconnected by one or more system busses which couple various system components to the logical processor 402. The system buses may be any of several types of bus structures including a memory bus or memory controller, a peripheral bus, and a local bus using any of a variety of bus architectures. In example embodiments the computer readable storage media 410 can include for example, random access memory (RAM) 404, storage device 406, e.g., electromechanical hard drive, solid state hard drive, etc., firmware 408, e.g., FLASH RAM or ROM, and removable storage devices 418 such as, for example, CD-ROMs, floppy disks, DVDs, FLASH drives, external storage devices, etc. Other types of computer readable storage media can be used such as magnetic cassettes, flash memory cards, and/or digital video disks.

The computer readable storage media 410 can provide nonvolatile and volatile storage of processor executable instructions 422, data structures, program modules and other data for the computer 400 such as executable instructions that effectuate manager 550 described in the following figures. A basic input/output system (BIOS) 420, containing the basic routines that help to transfer information between elements within the computer system 400, such as during start up, can be stored in firmware 408. A number of programs may be stored on firmware 408, storage device 406, RAM 404, and/or removable storage devices 418, and executed by logical processor 402 including an operating system and/or application programs.

Commands and information may be received by computer 400 through input devices 416 which can include, but are not limited to, a keyboard and pointing device. Other input devices may include a microphone, joystick, game pad, scanner or the like. These and other input devices are often connected to logical processor 402 through a serial port interface that is coupled to the system bus, but may be connected by other interfaces, such as a parallel port, game port, or universal serial bus (USB). A display or other type of display device can also be connected to the system bus via an interface, such as a video adapter which can be part of, or connected to, a graphics processor unit (GPU) 412. In addition to the display, computers typically include other peripheral output devices, such as speakers and printers (not shown). The exemplary system of FIG. 4 can also include a host adapter, Small Computer System Interface (SCSI) bus, and an external storage device connected to the SCSI bus.

Computer system 400 may operate in a networked environment using logical connections to one or more remote computers. The remote computer may be another computer, a server, a router, a network PC, a peer device or other common network node, and typically can include many or all of the elements described above relative to computer system 400.

When used in a LAN or WAN networking environment, computer system 400 can be connected to the LAN or WAN through network interface card (NIC) 414. The NIC 414, which may be internal or external, can be connected to the system bus. In a networked environment, program modules depicted relative to the computer system 400, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 5:
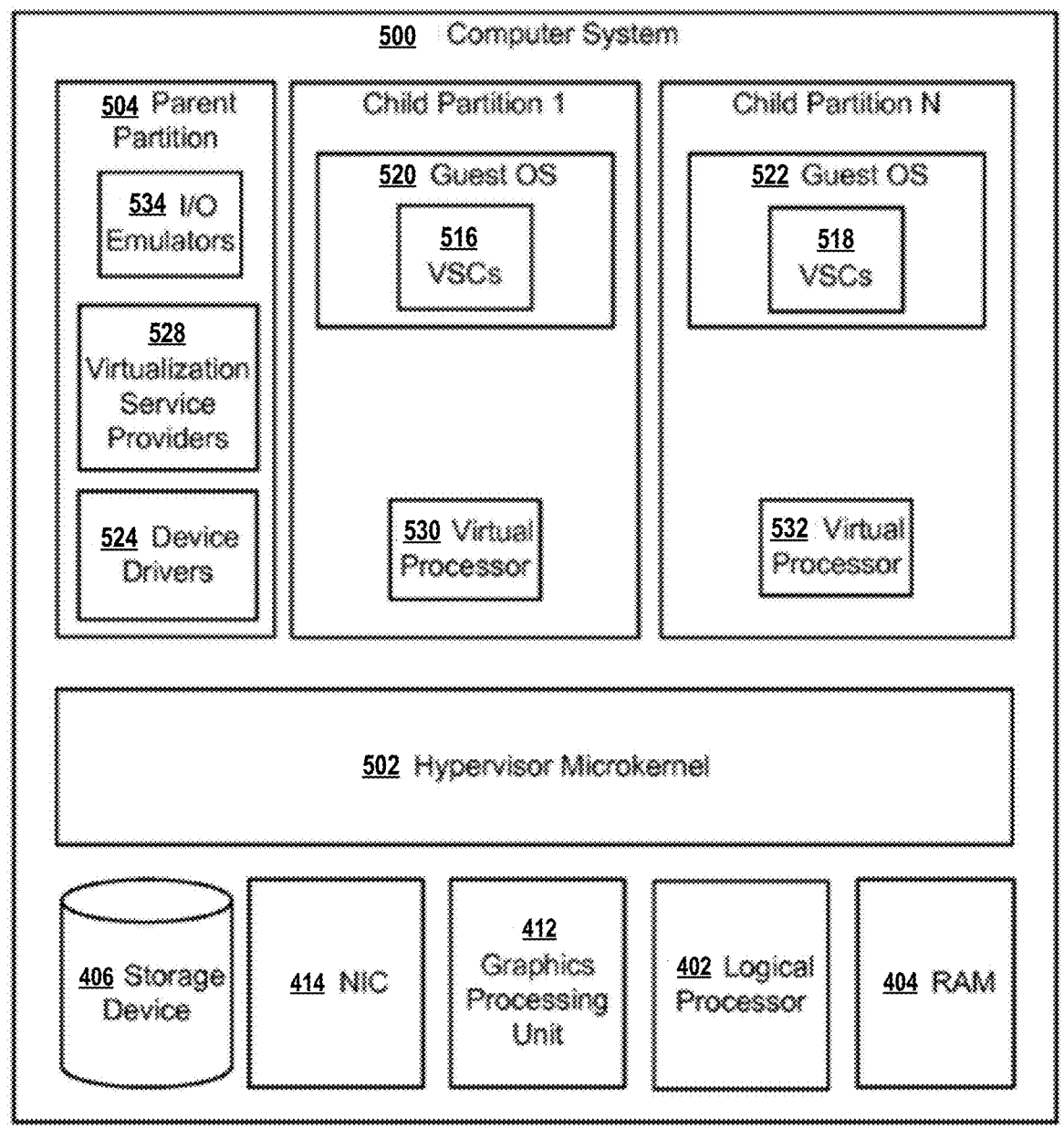
FIG. 5 is a diagram illustrating a virtual machine computing system.

Turning to FIG. 5, hypervisor microkernel 502 can be configured to control and arbitrate access to the hardware of computer system 500. The computer system 500 may employ the storage device 406, the NIC 414, the GPU 412, the logic processor 402, and the RAM 404 as described supra. Broadly, hypervisor microkernel 502 can generate execution environments called partitions such as child partition 1 through child partition N (where N is an integer greater than 1). In embodiments, a child partition is the basic unit of isolation supported by hypervisor microkernel 502. Hypervisor microkernel 502 can isolate processes in one partition from accessing another partition's resources, e.g., a guest operating system in one partition may be isolated from the memory of another partition and thus may not be able to detect memory addresses outside of its partition. Each child partition can be mapped to a set of hardware resources, e.g., memory, devices, logical processor cycles, etc., that is under control of the hypervisor microkernel 502. In embodiments hypervisor microkernel 502 can be a stand-alone software product, a part of an operating system, embedded within firmware of the motherboard, specialized integrated circuits, or a combination thereof.

Hypervisor microkernel 502 can enforce partitioning by restricting a guest operating system's view of system memory. Guest physical memory (GPM) is a partition's view of memory that is controlled by hypervisor microkernel 502. System physical memory (SPM) is the memory from the view of hypervisor microkernel 502. Pages are fixed length blocks of memory with starting and ending addresses. System physical memory can be allocated to virtual machines as guest physical memory. Thus, a page of memory allocated to a virtual machine will have a guest physical address (the address used by the virtual machine) and a system physical address (the actual address of the page). The term guest physical memory is a shorthand way of describe a page of memory from the viewpoint of a virtual machine and the term system physical memory is shorthand way of describing a page of memory from the viewpoint of the physical system.

A guest operating system may virtualize guest physical memory. Virtual memory is a management technique that allows an operating system to over commit memory and to give an application sole access to a contiguous working memory. In a virtualized environment, a guest operating system can use one or more page tables to translate virtual addresses, known as virtual guest addresses into guest physical addresses. Thus, a memory address may have a guest virtual address, a guest physical address, and a system physical address in an exemplary embodiment.

In the depicted example, parent partition component 504, which can also be also thought of as similar to domain 0 of Xen's open source hypervisor is illustrated. Parent partition 504 in this operational environment can be configured to provide resources to guest operating systems executing in the child partitions 1-N by using virtualization service providers 528 (VSPs) that are typically referred to as backend drivers in the open source community. Broadly, VSPs 528 can be used to multiplex the interfaces to the hardware resources by way of virtualization service clients (VSCs) (typically referred to as front-end drivers in the open source community) and communicate with the virtualization service clients via communication protocols. As shown by the figures, virtualization service clients can execute within the context of guest operating systems. These drivers are different than the rest of the drivers in the guest in that they may be supplied with a hypervisor, not with a guest.

As shown by the figure, emulators 534, e.g., virtualized IDE devices, virtualized video adaptors, virtualized NICs, etc., can be configured to run within the parent partition 504 and attached to resources available to guest operating systems 520 and 522. For example, when a guest OS touches a register of a virtual device or memory mapped to the virtual device microkernel hypervisor 502 can intercept the request and pass the values the guest attempted to write to an associated emulator.

Each child partition can include one or more virtual processors (530 and 532) that guest operating systems (520 and 522) can manage and schedule threads to execute thereon. Generally, the virtual processors are executable instructions and associated state information that provide a representation of a physical processor with a specific architecture. For example, one virtual machine may have a virtual processor having characteristics of an INTEL x86 processor, whereas another virtual processor may have the characteristics of an ARM processor. The virtual processors in this example can be mapped to logical processors of the computer system such that the instructions that effectuate the virtual processors will be backed by logical processors. Thus, in an embodiment including multiple logical processors, virtual processors can be simultaneously executed by logical processors while, for example, other logical processor execute hypervisor instructions. The combination of virtual processors and memory in a partition can be considered a virtual machine.

Guest operating systems (520 and 522) can be any operating system such as, for example, operating systems from MICROSOFT®, APPLE®, the open source community, etc. The guest operating systems can include user/kernel modes of operation and can have kernels that can include schedulers, memory managers, etc. Generally speaking, kernel mode can include an execution mode in a logical processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 6:
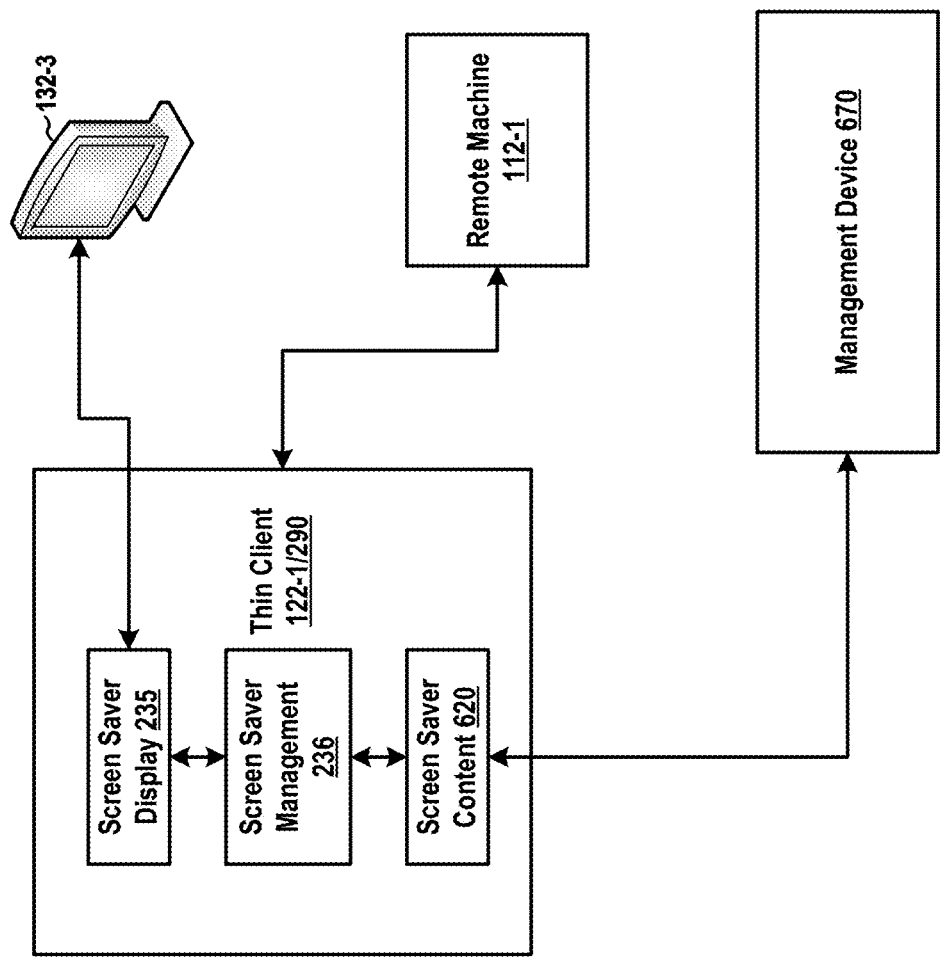
FIG. 6 is a diagram illustrating a thin client that is in communication with a remote machine and a management device.

FIG. 6 is a diagram 600 illustrating a thin client 122-1 that is in communication with a remote machine 112-1 and a management device 670. Although FIG. 6 shows the thin client 122-1/thin client 290 and the remote machine 112-1, the thin client may be any of the thin clients 122-1, 122-2, . . . , 122-M and the remote machine may be any of the remote machines 112-1, 112-2, . . . , 112-N. As described supra, the thin client 122-1 may allow a user to access the remote machine 112-1 over a network.

Further, in certain configurations, the screen saver display component 235 of the thin client 122-1 is responsible for displaying screen saver when one of one or more predetermined conditions is met. The conditions may be, for example, that the thin client 122-1 has been idle for a predetermined time period (e.g., 30 minutes) or that the thin client 122-1 receives a specific input (e.g., one or more specific key strokes such as "Ctrl" and "Esc" have been pressed). Once one of the conditions is met, the screen saver display component 235 may retrieve, from the screen saver management component 236, a screen saver to be displayed on a display 132-3 of the thin client 122-1. The screen saver display component 235 may retrieve an updated screen saver from the screen saver management component 236 again in accordance with a predetermined schedule (e.g., every minutes).

The screen saver management component 236 manages screen saver content 620 and generates a screen saver to be displayed by the screen saver display component 235 using the screen saver content 620. The screen saver content 620 may be stored on the storage component 214. The screen saver content 620 may include multiple collections of content data, which may include system live status data collection, system health data collection, system maintenance data collection, system power data collection, network announcement data collection, etc. The screen saver management component 236 can generate a screen saver that includes one or more selected collections of the content data. As such, the selected collections of the content data are presented on the display 132-3.

In certain configurations, the screen saver management component 236 is configured with user preferences of collections of content data to be displayed. For example, the screen saver management component 236 may have a configuration file that indicates the user preferences, such as thin client live (real-time) status data. Accordingly, when receiving a request for a screen saver, the screen saver management component 236 generates a screen saver including thin client live (real-time) status data based on the user preferences and returns that screen saver to the screen saver display component 235. In certain configurations, the screen saver management component 236 may use a set of rules to select the data collection to be included in a screen saver. For example, the rules may specify that system maintenance data are to be included in the screen savers generated in the morning, while network announcement data are to be included in the screen savers generated in the afternoon.

Upon receiving a call from the screen saver display component 235, the screen saver management component 236 determines, e.g., based on the configurations or rules, a collection of content data to be included in a screen saver. The screen saver management component 236 then uses the collection of content data, e.g., available in the screen saver content 620 or obtained from the network, to generate a screen saver. A screen saver may include a series of screen saver images or one or more videos. Subsequently, the screen saver management component 236 returns a screen saver image or video to the screen saver display component 235.

In one example, when the screen saver display component 235 calls a function of the screen saver management component 236 to request a screen saver, the screen saver management component 236 determines that run-time status data are to be displayed on the screen saver. The screen saver content 620 may not include a real-time live-status data collection. The screen saver management component 236 calls the system of the thin client and gathers the run-time status data. The screen saver management component 236 can obtain the startup/boot time of the thin client 122-1. The screen saver management component 236 then can calculate the time period during which the thin client 122-1 is up and running. Further, the screen saver management component 236 may determine that thin client 122-1 is operating in a power saving mode and can save certain amount of energy per hour. The screen saver management component 236 calculated the amount of energy that have been saved for the run-time period. As such, the screen saver management component 236 generates a screen saver including images presenting statements such as "Your thin client is up and running for 2 days 15 minutes 28 second," "You have saved 500 Watts so far," or "It has been 14 days since you last took a backup." The screen saver management component 236 accordingly sends to the screen saver display component 235 such a screen saver including images showing the run-time status data. Thus, the screen saver display component 235 displays the screen saver presenting run-time status data.

In another example, when the screen saver display component 235 calls a function of the screen saver management component 236 to request a screen saver, the screen saver management component 236 determines that system-updates data are to be displayed on the screen saver. Previously, the screen saver management component 236 may call the system of the thin client 122-1 to determine the version of the firmware running on the thin client 122-1 according to a schedule (e.g., weekly). Further, the screen saver management component 236 may also send a message to the management device 670 to request information regarding the most current version available. The management device 670 may send, to the screen saver management component 236, a response including information regarding the most current version. The screen saver management component 236 compares the version running and the most current version to determines if the thin client 122-1 needs an update. The screen saver management component 236 then stores that information in a system-updates data collection of the screen saver content 620. As such, in response to the call from the screen saver display component 235, the screen saver management component 236 obtains the system-updates data collection from the screen saver content 620. Based on the system-updates data collection, the screen saver management component 236 can generate a screen saver including screen saver images presenting the announcement "Administrator has planned for a scheduled maintenance on 15th of this month 6-9 pm." The screen saver management component 236 accordingly sends to the screen saver display component 235 such a screen saver. Thus, the screen saver display component 235 displays the screen saver presenting the current network announcement.

In yet another example, when the screen saver display component 235 calls a function of the screen saver management component 236 to request a screen saver, the screen saver management component 236 determines that network announcement data are to be displayed on the screen saver. The screen saver management component 236 may always request the current network announcement from the management device 670. More specifically, the management device 670 sends a message to the management device 670 to retrieve the current announcement. The management device 670 may send, to the screen saver management component 236, a response including the current announcement. The screen saver management component 236 can generate a screen saver including screen saver images indicating either the system of the thin client 122-1 is up-to-date or needs an update with statements such as "Your system is up-to-date" or "Your system requires an update." The screen saver management component 236 accordingly sends to the screen saver display component 235 such a screen saver. Thus, the screen saver display component 235 displays the screen saver indicating whether a system update is needed.

Figure 7:
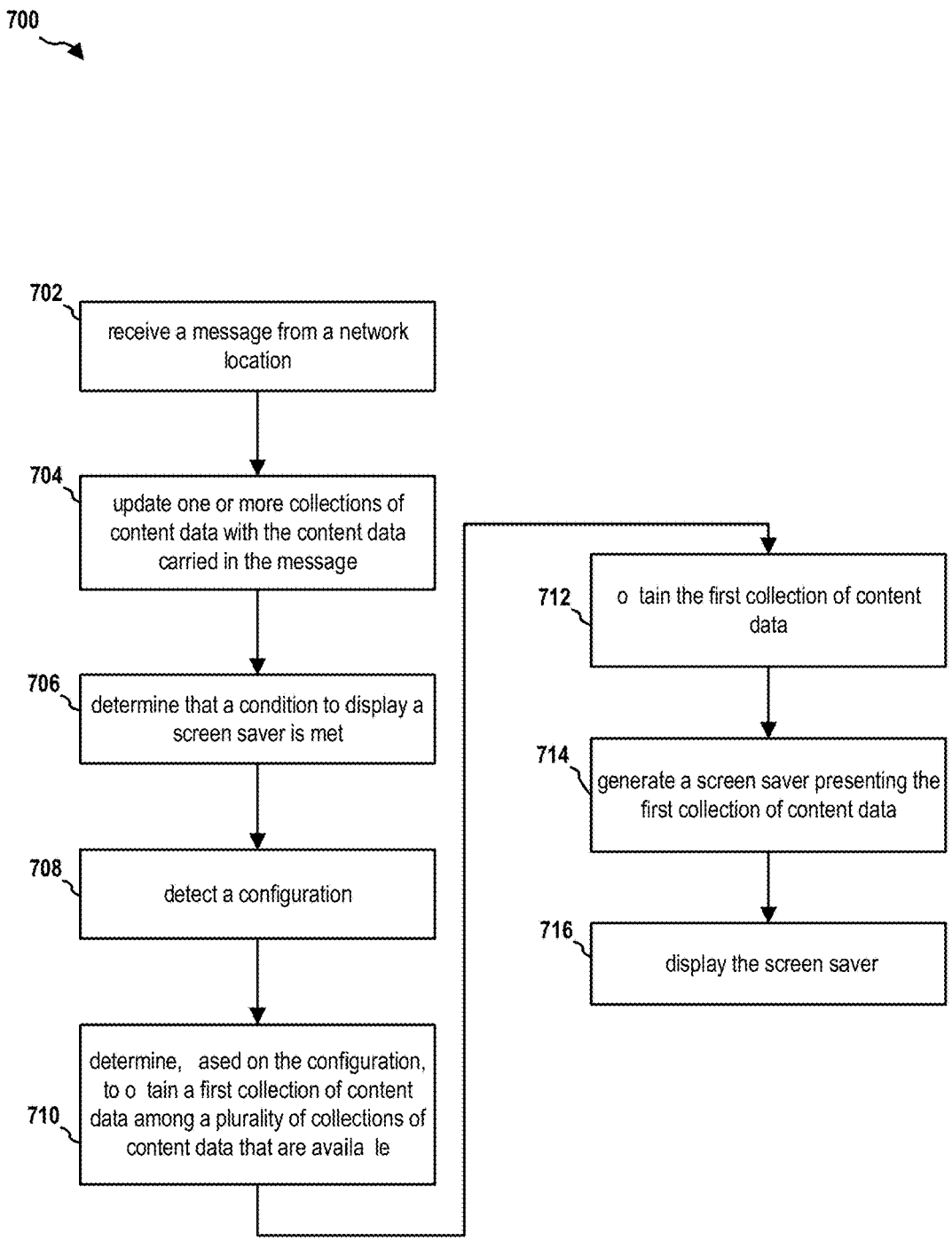
FIG. 7 is a flow chart of a method (process) for providing data to a screen saver.

FIG. 7 is a flow chart 700 of a method (process) for providing data to a screen saver. The method may be performed by a thin client (e.g., the thin client 122-1 and the apparatus 290/290'). In certain configurations, a plurality of collections are stored locally at the thin client. At operation 702, the thin client receives a message from a network location (e.g., the management device 670). The message carries content data (e.g., the version number of most recent firmware) to be included in one or more collections of the plurality of collections of content data. At operation 704, the thin client updates the one or more collections with the content data carried in the message.

At operation 706, the thin client determines that a condition (e.g., the thin client is idle for a predetermined time period) for displaying a screen saver is met. At operation 708, the thin client detects a configuration (e.g., user preferences). At operation 710, the thin client determines, based on the configuration, to obtain a first collection of content data among a plurality of collections of content data that are available.

At operation 712, the thin client obtains a first collection of content data. At operation 714, the thin client generates a screen saver presenting the first collection of content data. At operation 716, the thin client displays the screen saver.

In certain configurations, the thin client generates the first collection of content data based on live status of the thin client. In certain configurations, the first collection of content data indicates at least one of system health information, system maintenance information, and system power information. In certain configurations, to obtain the first collection of content data, the thin client sends a request to a network location to retrieve the first collection of content data. The thin client receives response carrying the first collection of content data from the network location. In certain configurations, the first collection of content data indicates system administrative information (e.g., a network announcement).

Figure 8:
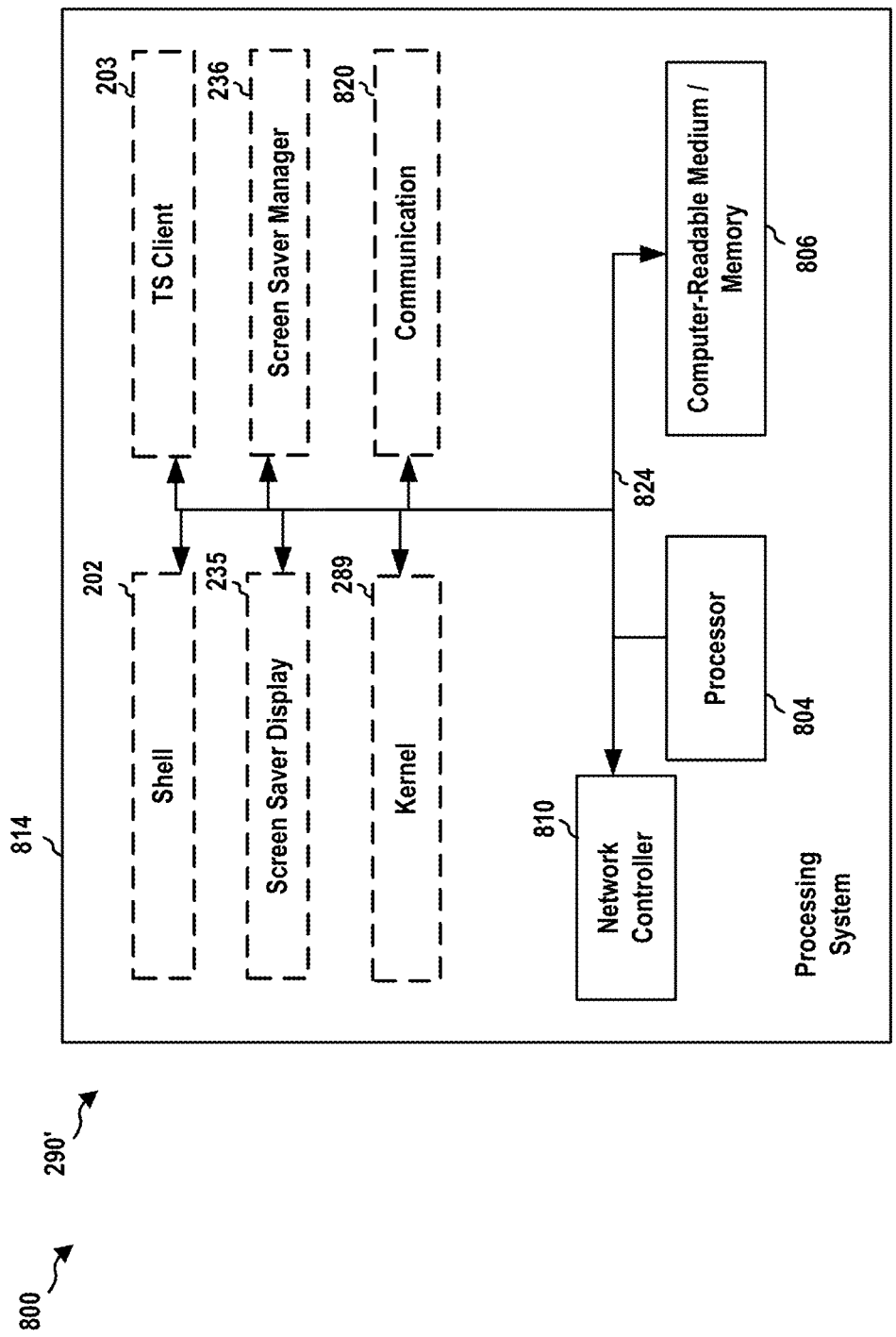
FIG. 8 is a diagram illustrating an example of a hardware implementation for an apparatus employing a processing system.

FIG. 8 is a diagram 800 illustrating an example of a hardware implementation for an apparatus 290' (e.g., the thin client 290) employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, including the processor 804 the computer-readable medium/memory 806, and the network controller 810. In particular, the computer-readable medium/memory 806 may include the memory 201 and the storage component 214. The bus 824 may also link various other circuits such as timing sources, peripherals, voltage regulators, and power management circuits, which are well known in the art, and therefore, will not be described any further.

The processing system 814 may be coupled to a network controller 810. The network controller 810 provides a means for communicating with various other apparatus over a network. The network controller 810 receives a signal from the network, extracts information from the received signal, and provides the extracted information to the processing system 814, specifically the communication component 820. In addition, the network controller 810 receives information from the processing system 814, specifically the communication component 820, and based on the received information, generates a signal to be sent to the network. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system further includes at least one of the shell 202, the TS client 203, the screen saver display component 235, the screen saver management component 236, and the kernel 289. The components may be software components running in the processor 804, resident/stored in the computer readable medium/memory 806, one or more hardware components coupled to the processor 804, or some combination thereof.

The apparatus 290' may be configured to include means for performing each of the operations described supra referring to FIG. 7. The aforementioned means may be one or more of the aforementioned components of the apparatus 290 and/or the processing system 814 of the apparatus 290' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a thin client, comprising:
   determining first version information of first firmware running on a thin client;
   retrieving second version information of second firmware available for update at a network location;
   determining that the thin client is operating in a power saving mode;
   determining a run-time period of the thin client based on a startup time of the thin client; and
   calculating an amount of energy that the thin client has saved during the run-time period;
   generating a first collection of content data based on comparison of first version information and the second version information, wherein the first collection of content data indicates whether a firmware update is available for the thin client and indicates a live status of the thin client including the amount of energy;
   determining that a condition for displaying a screen saver is met;
   obtaining the first collection of content data;
   generating a screen saver presenting the first collection of content data; and
   displaying the screen saver that presents the amount of energy.

2. The method of claim 1, further comprising:
   detecting a configuration; and
   determining, based on the configuration, to obtain the first collection of content data among a plurality of collections of content data that are available.

3. The method of claim 2, wherein the plurality of collections are stored locally at the thin client, the method further comprising:
   receiving a message from a network location, the message carrying content data to be included in one or more collections of the plurality of collections of content data; and
   updating the one or more collections with the content data carried in the message.

4. The method of claim 1, wherein the first collection of content data indicates at least one of system health information, system maintenance information, and system power information.

5. The method of claim 1, wherein the obtaining the first collection of content data further comprises:
   sending a request to a network location to retrieve the first collection of content data; and
   receiving a response carrying the first collection of content data from the network location.

6. The method of claim 5, wherein the first collection of content data indicates system administrative information.

7. An apparatus, comprising:
a thin client including:
a memory containing program instructions; and
at least one processor coupled to the memory and, when executing the program instructions, configured to:
determine first version information of first firmware running on the thin client;
retrieve second version information of second firmware available for update at a network location;
determine that the thin client is operating in a power saving mode;
determine a run-time period of the thin client based on a startup time of the thin client;
calculate an amount of energy that the thin client has saved during the run-time period;
generate a first collection of content data based on comparison of first version information and the second version information, wherein the first collection of content data indicates whether a firmware update is available for the thin client and indicates a live status of the thin client including the amount of energy;
determine that a condition for displaying a screen saver is met;
obtain the first collection of content data;
generate a screen saver presenting the first collection of content data; and
display the screen saver that presents the amount of energy.

8. The apparatus of claim 7, wherein the at least one processor is further configured to:
detect a configuration; and
determine, based on the configuration, to obtain the first collection of content data among a plurality of collections of content data that are available.

9. The apparatus of claim 8, wherein the plurality of collections are stored locally at the thin client, wherein the at least one processor is further configured to:
receive a message from a network location, the message carrying content data to be included in one or more collections of the plurality of collections of content data; and
update the one or more collections with the content data carried in the message.

10. The apparatus of claim 7, wherein the first collection of content data indicates at least one of system health information, system maintenance information, and system power information.

11. The apparatus of claim 7, wherein to obtain the first collection of content data, the at least one processor is further configured to:
send a request to a network location to retrieve the first collection of content data; and
receive a response carrying the first collection of content data from the network location.

12. The apparatus of claim 11, wherein the first collection of content data indicates system administrative information.

13. A non-transitory computer-readable medium storing computer executable code for operating a thin client, comprising code to:
determine first version information of first firmware running on a thin client;
retrieve second version information of second firmware available for update at a network location;
determine that the thin client is operating in a power saving mode;
determine a run-time period of the thin client based on a startup time of the thin client;
calculate an amount of energy that the thin client has saved during the run-time period;
generate a first collection of content data based on comparison of first version information and the second version information, wherein the first collection of content data indicates whether a firmware update is available for the thin client and indicates a live status of the thin client including the amount of energy;
determine that a condition for displaying a screen saver is met;
obtain the first collection of content data;
generate a screen saver presenting the first collection of content data; and
display the screen saver that presents the amount of energy.

14. The non-transitory computer-readable medium of claim 13, wherein the code is further configured to:
detect a configuration; and
determine, based on the configuration, to obtain the first collection of content data among a plurality of collections of content data that are available.

15. The non-transitory computer-readable medium of claim 14, wherein the plurality of collections are stored locally at the thin client, wherein the code is further configured to:
receive a message from a network location, the message carrying content data to be included in one or more collections of the plurality of collections of content data; and
update the one or more collections with the content data carried in the message.

16. The non-transitory computer-readable medium of claim 13, wherein the first collection of content data indicates at least one of system health information, system maintenance information, and system power information.

17. The non-transitory computer-readable medium of claim 13, wherein to obtain the first collection of content data, the code is further configured to:
send a request to a network location to retrieve the first collection of content data; and
receive a response carrying the first collection of content data from the network location.

* * * * *